July 4, 1933.  D. F. WARNER ET AL  1,917,171
GOVERNING MECHANISM FOR ELASTIC FLUID TURBINES
Filed March 16, 1931
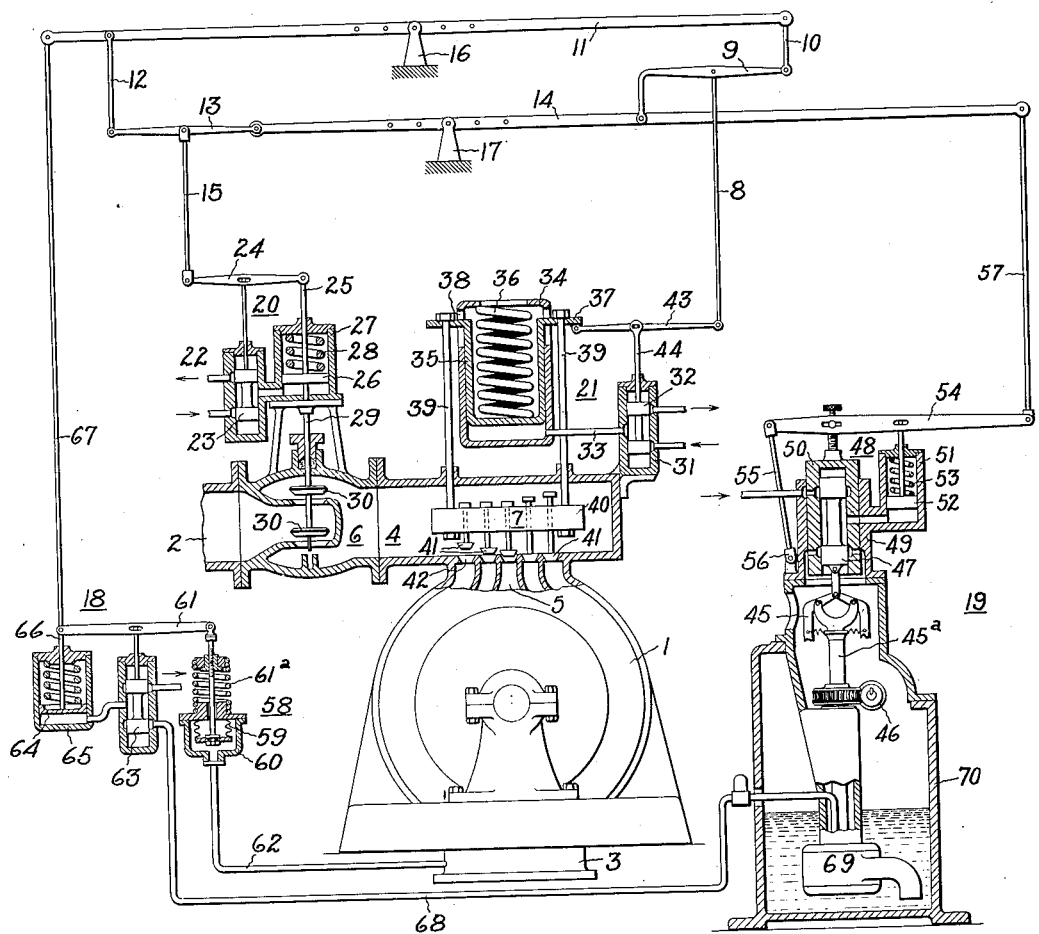
Inventor:
Donald F. Warner,
Edward V. Pollard,
by Charles E. Tillar
Their Attorney.

Patented July 4, 1933

1,917,171

UNITED STATES PATENT OFFICE

DONALD F. WARNER AND EDWARD V. POLLARD, OF LYNN, MASSACHUSETTS, ASSIGNORS TO GENERAL ELECTRIC COMPANY, A CORPORATION OF NEW YORK

GOVERNING MECHANISM FOR ELASTIC FLUID TURBINES

Application filed March 16, 1931. Serial No. 522,916.

The present invention relates to governing mechanisms for elastic fluid turbines, and especially to governing mechanisms for what are usually termed back pressure turbines, that is, turbines wherein the exhaust from the turbine is maintained at a certain pressure and is used for industrial purposes, the turbine being controlled in terms of the exhaust pressure. Ordinarily, turbines of this type have their speed fixed by external means, for instance, by an electric generator driven by the turbine and connected to a line of constant frequency, i. e., in parallel with other generators. Under these conditions, the speed of the turbine cannot vary and the admission of elastic fluid is then controlled directly by the back pressure to maintain the back pressure at the desired value. The turbine carries only such load as is available from the elastic fluid admitted to the turbine, in accordance with the demand for exhaust elastic fluid.

In some instances, however, an external means for fixing the speed of the back pressure turbine is not available and it is desired to control the turbine in terms of both load and back pressure. The object of our invention is to provide an improved apparatus whereby the elastic fluid turbine may be controlled in terms of both load and back pressure. This enables such a turbine to operate as an independent unit.

Before considering our invention itself, attention may be called to the fact that the thermo-dynamic energy of the steam passing through a turbine is partially transformed into mechanical energy and the remainder of the energy exists in the exhausted steam in the form of heat energy. The part of the steam which is transformed into mechanical energy within the turbine may be termed "available energy" and in an ideal turbine, having no losses, it is equal to the mechanical load output of the turbine. The total transformed energy is proportional to the total amount of steam passing through the turbine and is a function of the pressure drop between inlet and outlet of the turbine.

Thus it is possible to change the mechanical load output of a turbine by changing the pressure drop of the steam while maintaining the amount constant; by changing the amount of steam while maintaining the pressure drop constant, or by changing both the pressure drop and the amount of steam.

In the present case there are two variable factors, namely, variable demand for exhaust steam and variable demand of mechanical load output. The first can be satisfied only by changing the amount of admitted steam. The latter variable factor which normally can be satisfied by any of the above mentioned possibilities is in the present case satisfied by changing the pressure drop of the steam in the turbine, more particularly by changing the pressure of the admitted steam. It is clear that, for instance, a change of the amount of admitted steam, owing to a change in demand for exhaust steam, would affect the mechanical load output of the turbine. This, however, is undesirable and is prevented according to our invention by a corresponding change of the pressure drop to the effect that the mechanical load output of the turbine remains constant. The change of pressure drop is obtained by changing the steam pressure in the inlet to the turbine.

One object of our invention accordingly consists in a method of regulating back pressure turbines according to which the amount and the pressure of admitted steam are simultaneously regulated so that, for instance, a change in load demand is satisfied without changing the back pressure steam condition, and vice versa.

Another object of our invention consists in the provision of two valve means in the admission conduit to the turbine which are simultaneously actuated in terms of exhaust steam demand and load output demand.

One of these valve means may be said to respond primarily to changes in mechanical load output, that is, it opens or closes when the mechanical load output demand decreases or increases; the other of said valve means may be said to respond primarily to changes in exhaust steam demand, that is, it opens or closes when said exhaust steam demand increases or decreases.

Said first mentioned valve means also responds secondarily to changes in exhaust steam demand, that is, if said second valve means opens, for instance, owing to an increased steam demand, the first valve means will close in order to maintain constant the load output.

In a corresponding sense, the second valve means responds secondarily to changes in load output, that is, if said first valve means opens, for instance, owing to an increased demand for load output, the second valve means will close in order to maintain constant the amount of admitted steam.

With respect to the primary purposes of the two valve means the first of these valve means may be termed a means for regulating the load output or in other words the available steam energy and the second of these valve means may be termed a valve for regulating the amount or flow of steam in terms of back pressure conditions. This terminology will be helpful in the further consideration of our invention, but it should be remembered that such terms are only proper with regard to the primary purposes of said valve means. The regulation of one of said valve means, for instance, said first valve means due to a change in demand for load output necessitates, as already stated, a regulation of said other valve means in order to maintain constant the exhaust steam conditions, and vice versa. With "exhaust steam condition" is meant the pressure or temperature or like state of the steam or like elastic fluid. To this end we connect the two valve means with each other by a suitable lever mechanism.

For a better understanding of our invention, attention is directed to the following description in connection with the drawing which illustrates a preferred embodiment of our invention.

Referring to the drawing, 1 designates a steam turbine having an admission conduit 2 and an exhaust conduit 3, the steam of the exhaust being used for any industrial purposes and the main shaft of the turbine connected to a suitable load, the speed of which is desired substantially constant.

According to the embodiment of our invention illustrated, we provide in a chest 4 between conduit 2 and the inlet 5 of the turbine, two valve means, in the present instance shown as a single throttling valve 6, for primarily regulating the steam pressure in chest 4 and accordingly the available energy of the steam, that is, the energy transformed into mechanical energy, while the steam is passed through the turbine, and a sectional type valve 7 for primarily regulating the amount of elastic fluid admitted to the turbine.

An increased demand of elastic fluid in the exhaust at constant load output without change in demand for mechanical load output, for example, necessitates an opening of the second valve means 7 to allow more steam to pass through the turbine. The increased amount of steam, however, would effect an increased transformation of steam energy into mechanical energy. The latter undesirable effect is prevented by partial closing of the first valve means 6 which thus diminishes the pressure in the chest 4 and accordingly the available steam energy. Similarly, an increase in load causing a decrease in speed of the turbine occurring without a change in exhaust steam demand would necessitate an opening of valve means 6 to increase the available energy and a closing of valve means 7 to maintain constant the flow of steam to exhaust. Thus it becomes clear that a correlated actuation of the two valve means is necessary to obtain this end whereby the actuation of one valve means simultaneously causes a definite actuation of the other valve means. This mutual actuation is achieved in the present instance by the provision of a lever mechanism 8, 9, 10, 11, 12, 13, 14 and 15. Two of these levers 11 and 14 are provided with adjustable fulcrums 16 and 17 respectively which divide said levers in certain ratios $a:b$ and $c:d$ respectively. These ratios determine the relation of mutual actuation of the two valve means 6 and 7. It will be noted that in the present illustration the left end of lever 11 is connected to a pressure responsive device 18 which causes a regulation in response to the demand of the elastic fluid in the exhaust 3 whereas the right end of lever 14 is connected to a speed responsive device 19 causing a regulation in response to the demand of mechanical load output of the turbine.

The actuation of the two valve means 6 and 7 through said lever mechanism is in the present instance effected by two fluid actuated motors 20 and 21 respectively, the first of which comprising a pilot-valve casing 22 having a pilot valve head 23 connected to a lever 24 which is pivoted at one end to link 15 of the lever mechanism and at the other end to a stem 25 carrying a piston 26 of cylinder 27. A spring 28 provided between piston 26 and the top of cylinder 27 presses said piston downwardly. In alignment with piston stem 25 is a stem 29 provided at its lower end with valve disks 30 forming a part of the valve means 6. The operation of such a fluid actuated motor, well known to those skilled in the art, is as follows: An upward movement of link 15 causes a corresponding movement of pilot valve piston 23 whereby oil or other liquid is drained off from the lower part of cylinder 27 to the effect that piston 26 moves downwardly, causing thereby a closing actuation of valve means 6. A downward movement of piston 26 also effects a corresponding downward movement of the pilot valve piston which thereby restores its original position.

The other fluid actuated motor 21 also comprises a pilot valve 31 having a piston 32 and a conduit 33 connected to the lower part of a cylinder 34. 35 designates a piston in cylinder 34 pressed downwardly by the action of a spring 36 and provided with flanged portion 37 extending outwardly through vertical slots 38 of the cylinder wall. Secured to said flanged portions 37 are two or more rods 39 carrying a bar 40. The latter forms a part of the sectional type valve and carries a plurality of valve disks 41 which in sequence can be seated against openings 42 leading to individual sections of the first stage nozzles of the turbine. Pivoted to one flanged portion 37 of said cylinder is a floating lever 43 which at its other end is pivoted to link 8 of the lever mechanism and at an intermediate point to stem 44 of pilot valve 32. As already stated, lever 14 of the lever mechanism is connected at its right end to a speed responsive device 19. This is shown in the present instance as a speed governor 45 provided on a shaft $45^a$ driven through a worm gear 46, the worm of which being provided on the turbine shaft. The fly weights of the speed governor are connected to the pilot valve piston 47 of a fluid actuated motor 48 comprising a pilot valve with an outer cylinder 49 surrounding a sleeve 50 and the piston 47. The pilot valve communicates through a conduit with the lower part of cylinder 51 in which is provided a piston 52 pressed downward by a spring 53. Sleeve 50 of the pilot valve and the piston 52 of the cylinder are pivotally connected to a lever 54, the left end of which is fulcrumed at 56 by means of a link 55 whereas the right end of lever 54 is connected by means of link 57 to lever 14 of the lever mechanism. The operation of the speed responsive mechanism is as follows: If the speed of the turbine increases, owing to a decrease in load output, pilot valve piston 47 is moved downwardly allowing oil to be drained off from the lower part of the cylinder and causing thereby a downward movement of the cylinder piston and consequently a clockwise movement of lever 14 around its fulcrum 17. The downward movement of piston 52 also effects a corresponding downward movement of the pilot valve sleeve 50 which thereby covers the pilot valve ports and restores the original position. A corresponding actuation takes place if the speed of the turbine decreases, due to an increasing load demand of the turbine, whereby the different parts move in opposite directions resulting in a counter-clockwise movement of lever 14 around its fulcrum 17.

The exhaust responsive device 18 controlling the admission of fluid to the turbine in terms of demand in the exhaust is shown in the present instance as comprising a pressure responsive device 58 which comprises a bellows 59 provided in a cylinder 60 and connected to a floating lever 61. The space between the bellows and the cylinder is connected by means of a pipe 62 to the exhaust of the turbine. A spring $61^a$ presses the bellows 59 downwardly. The floating lever 61 is also connected to the pilot valve 63 and the cylinder piston 64 of a fluid actuated motor. The operation of this exhaust responsive device is as follows: If the pressure in the exhaust increases, owing to a decreasing demand of exhaust steam, the bellows will collapse and thereby move the right end of lever 61 upwardly causing a corresponding upward movement of the pilot valve piston 63 to the effect that oil is drained off from the lower part of cylinder 65. The resulting downward movement of piston stem 66 and link 67 connecting this stem with the lever mechanism causes a counterclockwise movement of lever 11 around its fulcrum 16; the downward movement of piston 64 also causes a corresponding downward movement of pilot valve piston 63 which thereby restores its original position.

If the steam pressure in the exhaust decreases, due to an increased demand of fluid in the exhaust, corresponding movements of the exhaust responsive device will be caused but in the opposite direction and resulting therefore in a clockwise movement of lever 11 around its fulcrum 16.

It will be noted that the pilot valve of the exhaust responsive device is connected by means of a pipe 68 to a pump 69 which is provided in an oil tank 70 and shown as being driven by the same shaft which drives the speed governor. This pump may be used for supplying oil to the different fluid actuated motors and the oil of these motors may be returned to the same oil tank 70 or to any other tank.

Having stated the general principle and described the mechanism of our invention, we will now describe its operation.

An increasing load output at constant steam demand necessitates an unchanged flow of elastic fluid to the turbine but an increase of available energy of the steam passing through the bucket wheels. This is obtained by increasing the steam chest pressure, that is, by increasing the pressure in the space immediately following the throttling valve 6. The increase in chest pressure, due to the more opened throttling valve 6, necessitates, however, a partial closing of the sectional type valve in order to keep constant the flow of elastic fluid through the turbine. It is seen, therefore, that an increasing load at constant steam demand calls for an opening action of the throttling valve 6, together with a closing action of the sectional type valve 7. More specifically, an increasing load at constant steam demand causes a decrease in speed so that the fly weights of speed governor 45 move inwardly, thereby raising pilot valve piston 47. This allows oil to be pressed in the lower part of cylinder 51 so that cylinder piston 52 is moved upwardly, causing an upward movement of the right end of lever 54 and the link 57, resulting in a counter-clockwise movement of lever 14. The latter movement causes an upward movement of link 8 and a downward movement of link 15. The upward movement of link 8 effects, as already stated, an actuation of the fluid actuated motor 21 so that the sectional type valve 7 is further closed. The downward movement of lever 15 causes an actuation of fluid actuated motor 20, resulting in an opening action of throttle valve 6.

If the load demand of the turbine decreases at constant steam demand the speed of the turbine consequently increases, causing thereby an actuation of the regulating mechanism, as before described, but in opposite direction to the effect that valve means 6 is closed and valve means 7 opened.

If the steam demand increases at constant mechanical load demand the flow of elastic fluid through the turbine must be increased and the available energy of this steam decreased. This is achieved by an opening action of the sectional type valve 7 and a simultaneous closing action of the throttle valve 6. More specifically, an increased steam demand at constant load will effect an expanding action of bellows 59, due to the decreased pressure in the exhaust, and thereby will cause the pilot valve piston 63 to move downwardly allowing liquid to be supplied to the lower part of cylinder 65. This results in an upward movement of cylinder piston 64 and a corresponding movement of link 67 to the effect that lever 11 is turned in a clockwise direction. The clockwise movement of lever 11 effects a downward movement of link 8 and an upward movement of link 15, resulting in an opening action of the sectional type valve 7 and a closing action of throttle valve 6 respectively.

If the steam demand in the exhaust decreases at constant load, a collapsing action of the bellows will take place, due to the increased steam pressure in the exhaust, resulting in actuation of the mechanism as described before but in opposite direction to the effect that the sectional type valve is closed and the throttling valve opened.

It will be clearly seen that actuation of the mechanism, due to a changing load output, effects clockwise or counter-clockwise movement of lever 14 whereby the position of lever 11 remains unchanged, and that a change in steam demand at constant load output causes a clockwise or counter-clockwise movement of lever 11 whereby the position of lever 14 remains unchanged. The ratio of the mutual actuation of the two valve mechanisms depends on the ratio a:b and c:d of levers 11 and 14 respectively. Thus, the desired result, an accurate control of a back pressure turbine, is achieved independently from external means by proper adjustment of fulcrums 16 and 17 of the levers 11 and 14.

In case both the mechanical load output, as well as the exhaust steam, demand change simultaneously, an actuation of both levers 11 and 14 takes place and the resulting movements of links 8 and 15 can be considered as a super-position of two movements which would be obtained if the two changes would occur sequentially.

In accordance with the provisions of the patent statutes we have described the method of operation, together with the apparatus of our invention which we now consider to represent the best embodiment for carrying out the new methods but we desire to have it understood that the apparatus as shown is only illustrative and that changes may be made without departing from the scope of our invention.

What we claim as new and desire to secure by Letters Patent of the United States is:

1. The combination with an elastic turbine having an admission and an exhaust conduit, of two valve means for primarily regulating the pressure and the amount respectively of elastic fluid supplied to the turbine, and means for simultaneously positioning said valve means in response to the demand for elastic fluid in the exhaust end of the load output to maintain constant the amount of elastic fluid at varying load output and vice versa.

2. The combination with an elastic fluid turbine having an admission conduit and an exhaust conduit from which steam is supplied to an industrial plant, of a regulating mechanism comprising two valve means for primarily regulating the pressure and the amount respectively of elastic fluid admitted to the turbine, a lever mechanism connecting said valve means with each other to effect the positioning of one of said valve means in terms of movement of said other valve means for preventing the pressure regulation from causing a change in the amount of elastic fluid supplied to the turbine and vice versa.

3. The combination with an elastic fluid turbine having an admission conduit and an exhaust conduit from which steam is supplied to an industrial plant, of a regulating mechanism comprising two valve means for primarily regulating the pressure and the amount respectively of elastic fluid supplied to the turbine, a lever mechanism comprising two levers each having a fulcrum, said fulcrums dividing said levers in definite ratios, said lever mechanism connecting said valve means together for actuating one of said valve means in terms of movement of said other valve means to maintain constant the available energy of elastic fluid supplied to the turbine at varying amount of elastic fluid and vice versa.

4. The combination with an elastic fluid turbine having an admission conduit and an exhaust conduit, of a regulating mechanism comprising two valve means for regulating the pressure and the amount of elastic fluid to the turbine, fluid actuated motors for positioning said valve means, a lever mechanism connecting said fluid actuated motors together whereby the actuation of one motor causes simultaneously a definite actuation of the other motor, a pressure responsive device connected to the exhaust of said turbine, a fluid actuated motor actuated by said pressure responsive device and causing a regulation of said two valve means in response to the demand of fluid in the exhaust, a speed governor driven by said turbine, a fluid actuated motor actuated by said governor and effecting the regulation of said two valve means in response to the load output of said turbine.

5. The combination with an elastic fluid turbine having a plurality of passages leading to the first stage of said turbine, of a valve means comprising a plurality of valve disks for closing or opening in sequence said passages, another valve means for regulating the pressure of the admitted elastic fluid to said first valve means, an exhaust governor comprising a pressure responsive device which is connected with the exhaust and a fluid actuated motor controlled by said speed responsive device, a speed governor comprising a speed responsive device and a fluid actuated motor controlled by said speed responsive device, a lever mechanism connecting said exhaust and speed responsive devices with each other and with said two valve means, whereby both valve means are simultaneously regulated if the demand for exhaust steam or mechanical load output changes.

6. The combination with an elastic fluid turbine having an exhaust conduit from which elastic fluid is supplied for industrial purposes, of means for primarily regulating the rate of flow of elastic fluid to the turbine in terms of demand for elastic fluid in the exhaust, means for primarily regulating the available energy of the elastic fluid supplied to the turbine in terms of demand for mechanical load output, and means interconnecting both of said first named means for maintaining the available energy of the elastic fluid constant at varying demand for elastic fluid in the exhaust and vice versa.

7. The combination with an elastic fluid turbine having an exhaust conduit from which elastic fluid is supplied for industrial purposes, of means for primarily regulating the rate of flow of elastic fluid to the turbine in response to the demand for elastic fluid in the exhaust, and means for primarily regulating the available energy of the elastic fluid supplied to the turbine so as to maintain constant the load output of the turbine at varying amount of fluid supplied to the turbine.

8. The combination with an elastic fluid turbine having an exhaust conduit from which elastic fluid is supplied for industrial purposes, of means for primarily regulating the available energy of the elastic fluid in response to the demand for mechanical load output, and means for maintaining constant the rate of flow of elastic fluid to the exhaust at varying load output.

9. In combination with an elastic fluid engine having an exhaust conduit from which elastic fluid is supplied for industrial purposes and a speed governing mechanism for regulating the admission of elastic fluid to the engine in terms of demand for load output, of means including a part of the speed governing mechanism for regulating the supply of elastic fluid to the engine in response to a condition of the elastic fluid in the exhaust at constant load output, and for maintaining the condition of elastic fluid in the exhaust constant at varying load ouput.

10. In combination with an elastic fluid engine having an exhaust conduit from which elastic fluid is supplied for industrial purposes and a speed governing mechanism for regulating the admission of elastic fluid to the engine in terms of demand for load output, of means including a part of the speed governing mechanism and two valves provided in series as regards the direction of flow of elastic fluid for regulating the supply of elastic fluid to the engine in response to a condition of the elastic fluid in the exhaust at constant load output, and for maintaining the condition of elastic fluid in the exhaust constant at varying load output.

In witness whereof, we have hereunto set our hands.

DONALD F. WARNER.
EDWARD V. POLLARD.

CERTIFICATE OF CORRECTION.

Patent No. 1,917,171.

July 4, 1933.

DONALD F. WARNER, ET AL.

It is hereby certified that error appears in the printed specification of the above numbered patent requiring correction as follows: Page 4, line 98, claim 1, for "end" read "and"; page 5, line 34, claim 5, for "speed" read "pressure"; and that the said Letters Patent should be read with these corrections therein that the same may conform to the record of the case in the Patent Office.

Signed and sealed this 22nd day of August, A. D. 1933.

M. J. Moore.

Acting Commissioner of Patents.

(Seal)